US012465936B2

(12) United States Patent
Patel et al.

(10) Patent No.: US 12,465,936 B2
(45) Date of Patent: Nov. 11, 2025

(54) VARIABLE HEIGHT FOR THRUST CORRECTION THROUGH PRESSURE SENSING IN ELECTROSTATIC COATING SYSTEM

(71) Applicant: Council of Scientific and Industrial Research, New Delhi (IN)

(72) Inventors: Manoj Kumar Patel, Chandigarh (IN); Anil Jangra, Chandigarh (IN); Ankit Khanchi, Chandigarh (IN)

(73) Assignee: COUNCIL OF SCIENTIFIC AND INDUSTRIAL RESEARCH, New Delhi (IN)

(*) Notice: Subject to any disclaimer, the term of this patent is extended or adjusted under 35 U.S.C. 154(b) by 427 days.

(21) Appl. No.: 17/905,715

(22) PCT Filed: Apr. 7, 2021

(86) PCT No.: PCT/IN2021/050343
§ 371 (c)(1),
(2) Date: Sep. 6, 2022

(87) PCT Pub. No.: WO2021/260717
PCT Pub. Date: Dec. 30, 2021

(65) Prior Publication Data
US 2023/0107205 A1  Apr. 6, 2023

(51) Int. Cl.
B05B 5/03       (2006.01)
A23B 7/16      (2006.01)
(Continued)

(52) U.S. Cl.
CPC ............. *B05B 12/006* (2013.01); *A23B 7/16* (2013.01); *B05B 5/03* (2013.01); *B05B 5/084* (2013.01);
(Continued)

(58) Field of Classification Search
None
See application file for complete search history.

(56) References Cited

U.S. PATENT DOCUMENTS 3,049,092 A   8/1962   Sedlacsik et al.
3,059,613 A  10/1962   Nakaya
(Continued)

FOREIGN PATENT DOCUMENTS

EP   0274163 A2   7/1988
EP   1170060 B1   8/2002
(Continued)

OTHER PUBLICATIONS

International Search Report in PCT/IN2021/050343 issued Aug. 23, 2021.
(Continued)

*Primary Examiner* — Binu Thomas
(74) *Attorney, Agent, or Firm* — Knobbe, Martens, Olson & Bear, LLP

(57) ABSTRACT

An electrostatic coating system including of a novel technique of height adjustment through pressure sensing and feedback mechanism in twin-phase air-assisted and forced-liquid flow based electrostatic nozzle(s). A variable height electrostatic edible coating system provides uniform and efficient coating to ensure shelf-life extension, improved nutritional value and enhanced sensory attribute.

11 Claims, 3 Drawing Sheets

(51) Int. Cl.
  *B05B 5/08* (2006.01)
  *B05B 5/10* (2006.01)
  *B05B 12/00* (2018.01)
  *B05B 15/68* (2018.01)

(52) U.S. Cl.
  CPC ............... *B05B 5/10* (2013.01); *B05B 15/68* (2018.02); *A23V 2002/00* (2013.01)

(56) References Cited

U.S. PATENT DOCUMENTS

| | | | |
|---|---|---|---|
| 4,732,777 A | 3/1988 | Smythe | |
| 4,822,647 A | 4/1989 | Nozaki et al. | |
| 5,615,606 A * | 4/1997 | Vos | B65G 49/0418 |
| | | | 198/816 |
| 5,800,615 A * | 9/1998 | Lambert | B05B 5/08 |
| | | | 118/309 |
| 6,312,740 B1 * | 11/2001 | Roberts | B05B 15/25 |
| | | | 426/89 |
| 2006/0017916 A1 * | 1/2006 | Clarke | B05C 11/10 |
| | | | 356/300 |
| 2006/0292271 A1 * | 12/2006 | King | B05B 5/087 |
| | | | 426/235 |
| 2015/0030780 A1 * | 1/2015 | Rogers | B05B 5/0535 |
| | | | 427/483 |
| 2021/0186065 A1 * | 6/2021 | Novotny | B05B 5/087 |

FOREIGN PATENT DOCUMENTS

| | | |
|---|---|---|
| EP | 1654933 A1 | 5/2006 |
| EP | 2468107 A1 | 6/2012 |
| GB | 2277469 A | 11/1994 |

OTHER PUBLICATIONS

Written Opinion in International Application No. PCT/IN2021/050343 issued Aug. 23, 2021.

* cited by examiner

VARIABLE HEIGHT FOR THRUST CORRECTION THROUGH PRESSURE SENSING IN ELECTROSTATIC COATING SYSTEM

RELATED APPLICATIONS

This application is U.S. National Phase of International Application No. PCT/IN2021/050343, filed Apr. 7, 2021, designating the U.S. and published in English on Dec. 30, 2021, as WO 2021/260717 A1, which claims the benefit of Indian Application No. 202011026188, filed Jun. 22, 2020.

FIELD OF THE INVENTION

The present invention is in the field of electrostatic edible coating to freshly harvested fruits and vegetables and minimally processed food commodities; particularly relates to electrostatic spraying technology to provide enhanced coating efficiency and uniformity. The present invention relates to an electrostatic spraying arrangement having variable height for thrust correction through pressure sensing and feedback mechanism in twin-phase air-assisted and forced-liquid flow based nozzles of electrostatic edible coatings. The device has the utility in the field of food safety and food processing industry to enhance the shelf life, nutritional value and sensory attributes.

BACKGROUND OF THE INVENTION

To avoid the degradation, the respiration by fruits and vegetables through its skin has been targeted using various conventional methods such as spray coating of wax as mentioned in prior art no. EP2468107A1, dip coating of edible material as available in prior art no. EP1654933A1 etc. The dip coating does not provide uniform coating and also requires huge amount of edible material which leads to wastage of natural resources.

The conventional methods of coating to fruits and vegetables waste gallons of edible materials and increases the load of chemicals in the environment. While the present invention deploys the coating of edible materials through the electrostatic principles and auto-adjustment thrust correction mechanism, which uses significantly lesser amount of coating material and natural resources along with uniformity makes the process efficient and effective.

Electrostatic spraying is one of the most efficient and promising methods for liquid sprays onto the targets with higher mass-transfer efficiency and uniform deposition. The process of electrostatic coating involves generating a high electric field within the spray nozzle at atomization and charging zone, which imparts charge to liquid jet passing through a charging ring electrode. Patent no. EP0274163A2 discloses various processes with electrostatic nozzle for enhancement of shelf life with minimal utilization of water in various stages of processing under the controlled temperature and humidity conditions reducing the possibility of deterioration. U.S. Pat. Nos. 4,732,777A, 3,049,092 and 3,059,613 have utilized the electrostatic forces to control the trajectory of charged particulate matter for efficient deposition.

In electrostatic coating process, there are three major challenges which were encountered during the coating to fruits and vegetables to enhance the shelf life:

Change in the flow rate of the nozzle(s) with the change in the viscosity of the coating materials.

Thrust created by the droplets onto the object i.e. fruits and vegetables during the coating process in case of air-assisted nozzle(s).

Fixed position and orientation of the nozzle(s).

In most of the prior arts and technological inventions, electrostatic nozzles used in the coating systems are air-assisted which are based on air-induced principle. The variation in applied air pressure and the change in the viscosity of the material to be coated, changes the flow rate of the nozzle(s). Most of the prior arts discusses about electrostatic disinfection, sanitization and washing and in such cases the liquid to be sprayed is of less viscosity. None of the prior art discusses about high range viscous liquid materials to be coated in electrostatic coatings.

Another drawback of the existing systems is that, when charged droplets strike on objects viz. food commodities, fruits and vegetables etc. create the thrust or pressure over objects. This results into drifting away of the coating materials and the deviation from the natural free fall deposition of coating material onto the objects. The natural free fall of the coating material upon the objects is necessary because if the spray remains under the forced flow, then there is possibility of no attraction of coating material towards the object and hence many spots may remain uncoated. In case of free fall nature, the charged coating material gets attracted effectively to the object to be coated. The drifting of material in case of spraying may lead to loss of coating material. The drifting away of material due to breaching of thrust threshold limit may result into uncoated spots. These uncoated spots becomes hotspot of decaying in fruits and vegetables.

The nozzle fixed at one position do not give flexibility of changing orientation, and moving it to a particular spot over the roller-conveyor. This leads to many issues such as non-uniform coating, drifting and over-thrust acting on the objects. The spraying through electrostatic nozzle(s) follows Gaussian distribution, in which there are lesser droplets distribution on the outer periphery of the spray envelope.

OBJECTIVES OF THE INVENTION

The main object of the present invention is to design and develop an electrostatic coating system consists of height adjustment for thrust correction through pressure sensing and feedback mechanism and twin phase air-assisted and forced-liquid flow based nozzle(s).

Another object of the invention to provide forced-liquid flow to nozzle(s) along with the air-assistance. A unique concept of forced-liquid flow has been provided through the controlled liquid flow pump to compensate the offset in the desired liquid flow rate caused with the change in viscosity of liquid coating material.

Another object of the invention is to design an arrangement to provide the movement of electrostatic nozzle(s) in diagonally positioned nozzle-holding rail which gives a two dimensional motion of nozzle(s).

Another object of the invention is to develop a mechanism to control the position and orientation of electrostatic nozzle(s) for uniform coverage.

Another object of the present invention is to design a roller-conveyor mechanism in order to cover the contact point of the object in the developed electrostatic coating system for uniform coverage.

Another object of the present invention is to develop the charging mechanism to charge the liquid sprays for improved aerodynamics of charged particulate matter directed towards the object to be coated.

Another object of the present invention is to provide a sufficient amount of charge to droplets to ensure the wide range of conductive and viscous liquids without affecting the performance Yet another object of the present invention is to set a threshold value of charge-to-mass ratio below which, it should not reach irrespective of change in conductivity and viscosity of the liquid coating materials.

Yet another object of the present invention is to provide the improved conditions by exploiting the electrostatic force field to transport the fine droplets towards the said object.

Yet another object of the present invention is to make a suitable arrangement for dissipation of stray and unwanted currents developed during the operation of the electrostatic coating system.

Yet another object of the present invention is to make necessary arrangement of safety concern during the operation to avoid any shock and hazardous to the operator.

Yet another object of the present invention is to provide a mechanism to reuse the coating material in next cycle of the coating.

Yet still another object of the said invention is to develop an application specific high voltage power supply unit with current controlling mechanism for charging of liquid coating materials.

Yet still another object of the said invention is to provide current controlling mechanism to avoid any kind of damage to high voltage power supply unit.

With the above objects in view, the present invention consists of the combination and arrangement of parts hereinafter the details of this invention is described and illustrated in the accompanying drawings and more particularly pointed out in the appended claims, by considering the points mentioned, it being understood that changes may be made if required without disturbing/changing the basic principles and spirit of the invention or sacrificing any of the advantages of the invention.

SUMMARY OF THE INVENTION

The present invention provides the process, method and system for edible coatings based on an innovative mechanism of height adjustment for thrust correction through pressure sensing and feedback mechanism in electrostatic coating system to enhance the shelf life, nutritional value and sensory attributes of freshly harvested and minimally processed food commodities.

Edible materials such as Aloe Vera leaf gel, antimicrobials, antioxidants, polysaccharides and protein based coating materials with wide range of viscosity and conductivity can be efficiently and effectively coated by using a novel and innovative method of twin-phase air-assisted and forced-liquid flow based nozzle(s). A high level of uniformity and thin layer deposition onto the surface can be achieved by controlling the height of nozzle(s), liquid flow rate using forced-liquid supply and air-assistance to nozzle(s) and position and orientation of nozzle(s).

In the present invention, a unique concept of twin-phase air-assisted and forced-liquid flow has been incorporated to maintain the flow rate of the liquid coating material to be coated at a constant value irrespective of the variation in the viscosity of the liquid and applied air pressure. Along with it, the uniform deposition through free fall nature is ensured using the variable height auto-adjustment of the nozzle through the combination of servo-motors control mechanism.

As the nozzles are electrostatic principle based which results into very fine charged droplets in the range of 10-20 micron. These charged fine droplets have lesser mass and therefore, experiences gravitational force of lower magnitude and also the reduced vertically downward speed in comparison to conventional nozzle spray. Initially, when the droplets come out of the nozzle, the speed is high because of pressurized air along with forced-liquid flow. It develops excessive thrust which breaches a threshold limit of thrust acting upon the food commodity that results into drift away of coating material. Along with it, there are spots over the object remain uncoated. In order to solve the problem, a sensor is placed at the defined height from the roller-conveyor system. The sensor senses the thrust/pressure and accordingly, automatic adjustment of the nozzle(s) height takes place over the roller-conveyor mechanism so that lesser drifting of material takes place along with experiencing uniform deposition over the object in a free fall manner The free fall nature of spray makes the coating efficient and effective.

The cone angle and position in x, y and z direction are set according to the calculated position with respect to viscosity of material and the objects to be coated. The height adjustment of nozzle(s), movement in x, y, z direction and cone angle control is done using motion control mechanism. Motion control mechanism is a combination of transducers, feedback and servomotors. The nozzle(s) are twin-phase air-assisted and forced-liquid flow based electrostatic nozzle(s). The forced-liquid flow is taken along with the air-assistance in the electrostatic nozzle(s), so that any retardation caused in the liquid flow rate with the change in viscosity of coating material will be compensated to maintain the constant liquid flow.

BRIEF DESCRIPTION OF THE DRAWING

The present invention has been described by way of some set of examples in addition to the accompanying drawings, in which.

DETAILED DESCRIPTION OF THE INVENTION

Figure 1:
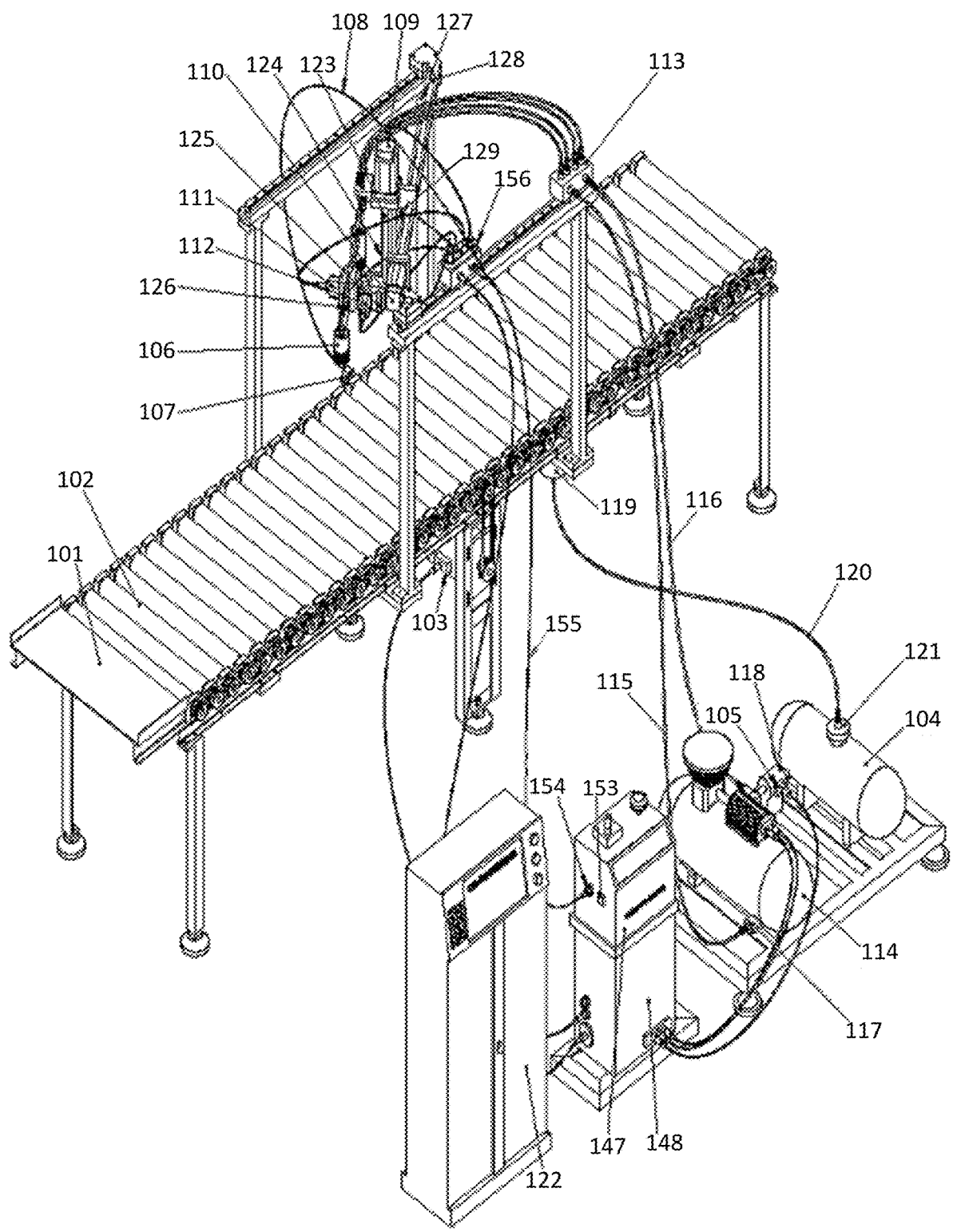
FIG. 1 represents a mechanism of variable height for thrust correction through pressure sensing and feedback in twin-phase air-assisted and forced-liquid flow based nozzle(s) of electrostatic edible coating system which comprises various embodiments of the invention such as motion and orientation control, motor drive, and twin-phase air-assisted and forced-liquid flow based electrostatic nozzle(s) represented as unit (A), roller-conveyor, material accumulator for drifted uncoated-coating material, pressure sensor, induction motor to drive the roller-conveyor termed as unit (B), control unit for position and orientation, electrical cabinet including application specific high voltage power supply unit with current controlling mechanism, air compressor, coating material reservoir and liquid flow control pump.
Figure 2:
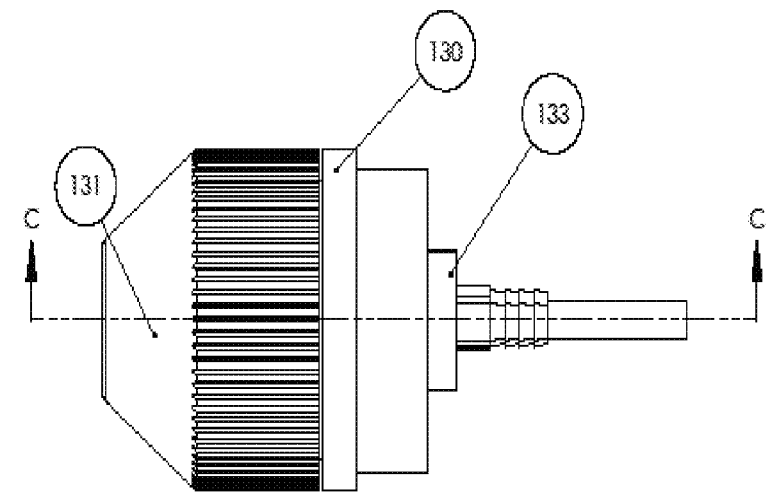
FIG. 2 represents a twin-phase air-assisted and forced-liquid flow based electrostatic nozzle(s). These nozzle(s) are using the combination of air-assistance and forced-liquid flow to atomize the liquid coating materials irrespective of change in applied air pressure.
Figure 2:
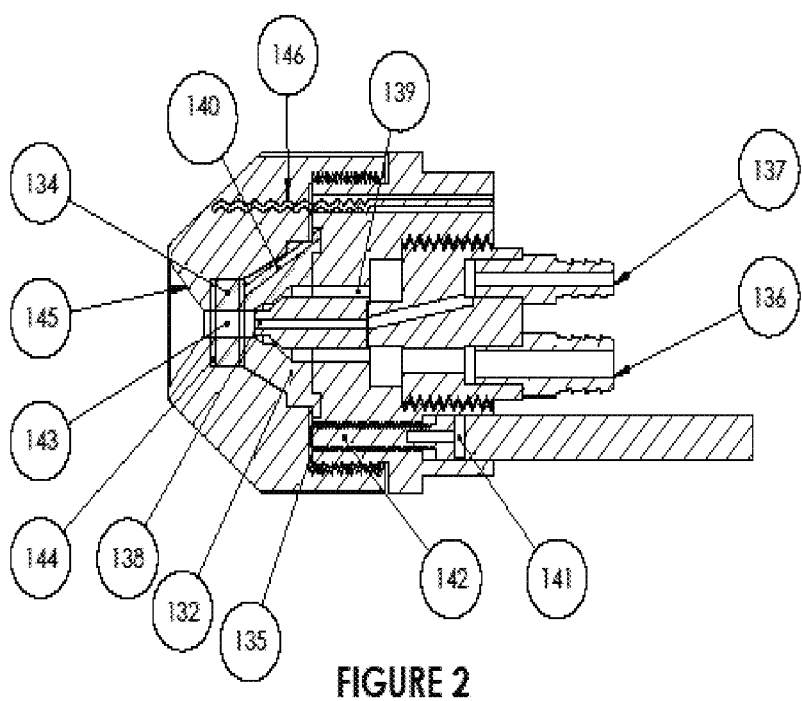
Figure 3:
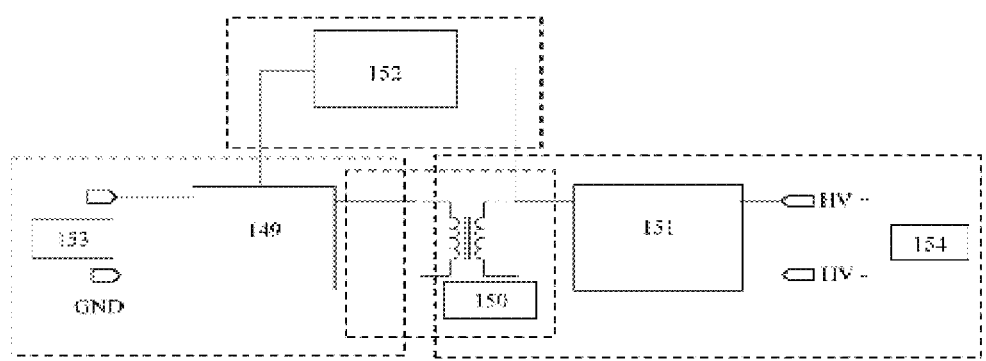
FIG. 3 represents an application specific high voltage power supply unit with device protection and current controlling mechanism. The developed high voltage power supply unit generates the desired high voltage in the range which is required for charging of liquid coating material.

Considering the FIG. 1, an embodiment of the variable height for thrust correction based electrostatic coating system of the present invention is described and the complete embodiment is marked and divided as (A), (B), (C) as separate units for the better understanding of the present invention. Each unit has its importance in overall functioning of the system and contributing to the present invention. The unit (A) consists of motion and orientation control and twin-phase air-assisted and forced-liquid flow based electrostatic nozzle(s), the unit (B) comprises roller-conveyor, material accumulator for drifted uncoated-coating material, pressure sensor and induction motor to drive the roller-conveyor, and the unit (C) consists of control unit for position and orientation, electrical cabinet, air compressor, coating material reservoir and liquid flow control pump. The electrical cabinet housing accommodates two types of power supplies i.e. application specific high voltage supply unit with current controlling mechanism for charging of liquid sprays and input voltage signals to drive the numerous motors and controlling units.

Referring to FIG. 1, initially the disinfected, washed and dried fruits and vegetables are fed on the receiver unit 101 of roller-conveyor system 102 for electrostatic edible coating. The roller-conveyor system is driven by an induction motor 103 with controlled rpm and power. Coating material from the material reservoir 104 has been pumped by a liquid flow control pump 105 to twin-phase air-assisted and forced-liquid flow based electrostatic nozzle(s) 106. The coating material sprayed electrostatically onto the objects lying over the roller-conveyor 102, with controlled pressure and residence time for uniform, effective and efficient coating.

The height of the tip of the twin-phase air-assisted and forced-liquid flow based electrostatic nozzle(s) 106 from the roller-conveyor 102 depends upon the size and shape of the object to be coated along with the viscosity of the liquid material used for coating. The height of tip of the nozzle(s) from the object to be coated is one of the most important factors for uniform coating in electrostatic coating processes. The ultra-low pressure sensor 107 has been placed at an average height of the objects to be coated from the roller-conveyor 102. The pressure sensor 107 can be removed or moved away from the roller-conveyor after one-time height measurement and setting of the nozzle(s) height from the object to be coated.

Pressure sensor 107 senses the thrust/pressure generated by pressurized and moving charged droplets onto the objects to be coated. The object to be coated could be fruits and vegetables, or any other food commodities.

The purpose of pressure sensing and accordingly setting the height of twin-phase air-assisted and forced-liquid flow based electrostatic nozzle(s) 106 is to avoid the over-thrust acting upon the object to be coated. This could provide and create the preferred conditions for free fall nature of charged spray. The height adjustment is done using motion control system. The motion control system consist of pressure sensor 107, feedback 108 and assembly of servo-motors. The assembly of servo-motors consist of four servo-motors namely z axis servo-motor 109, x-y axis servo-motor 110, spray envelop control servo-motor 111 and nozzle tilt-control servo-motor 112.

Although electrostatic spraying produces uniform and fine mist of charged droplets, the uniform and efficient coating requires free fall nature of spray. The free fall nature of charged spray do not leave any spot uncoated, and hence makes the electrostatic coatings more efficient and effective.

Referring to FIG. 1, the solution of edible material stored in material reservoir 104 is supplied to twin-phase air-assisted and forced-liquid flow based electrostatic nozzle(s) 106 via manifold 113. The manifold 113, a part of unit (A), is a distributing element which has inlet from air compressor 114 through air pipe 115 and material reservoir 104 through liquid supply pipe 116. The liquid flow control pump 105 connected in between material reservoir 104 and manifold 113 through liquid supply pipe 116.

The air compressor 114, which is a part of unit (C) supplies the compressed air to twin-phase air-assisted and forced-liquid flow based electrostatic nozzle(s) 106 through air pipe 115 via manifold 113. An air filter 117 is connected in-line with air pipe 115 at the outlet of air compressor 114. The twin-phase air-assisted and forced-liquid flow based electrostatic nozzle(s) 106 has liquid and air inputs from air compressor 114 and liquid material reservoir 104 via manifold 113. Since, the nozzle(s) may vary in number as per the application and flow rate required, therefore, the number of air supply pipes and liquid supply pipes may increase at the outlet of manifold 113. The purpose of the manifold 113 is to supply the liquid and air to various nozzles by distributing the air and liquid supply pipes to accommodate the number of nozzles at its outlet used in the coating system.

A liquid filter 118 is connected in-line with liquid supply pipe 116 at the outlet of liquid coating material reservoir 104. After electrostatic edible coating, the uncoated-coating material has been collected in the material accumulator 119 attached below the roller-conveyor of electrostatic coating system. The uncoated-coating material is carried to edible material reservoir 104 through liquid material recollecting pipe 120. The liquid filter 121 is connected in-line with liquid material recollecting pipe 120 at the inlet of material reservoir 104. All the liquid pipes used in the coating system are made up of food grade material which is non-reactive and non-corrosive in nature at normal/standard temperature and pressure.

Coating material from the material reservoir 104 has been pumped by a liquid flow control pump 105 to twin-phase air-assisted and forced-liquid flow based electrostatic nozzle(s) 106 via manifold 113, from where it is distributed to various nozzle(s). The nozzle(s) may vary in number as per the requirement of liquid flow rate and the number of object to be coated.

The twin-phase air-assisted and forced-liquid based electrostatic nozzle(s) 106 have height adjustment mechanism through motion control system. The motion control system comprises pressure sensor 107, feedback 108 and assembly of servo-motors, which adjusts the position of twin-phase air-assisted and forced-liquid based electrostatic nozzle(s) 106 in x, y and z axes and orientation. The position and orientation of nozzle(s) 106 has been achieved through four servo-motors namely z axis servo-motor 109, x-y axis servo-motor 110, spray envelop control servo-motor 111 and nozzle tilt-control servo-motor 112.

In case of coating, height adjustment of nozzle(s) is one of the important parameter, because if there is breach of threshold limit of pressure, then it can cause drifting of liquid material to be coated. This leads to the coated objects having uncoated spots. The free falling nature is preferable for uniform coating.

The ultra-low pressure sensor 107 senses the thrust/pressure over the average height of the object. The electrical signal fed back to control unit 122 through feedback 108 where it is analyzed and accordingly the drive inside the control unit 122 sends a signal to the z-axis servo-motor 109. The z-axis servo-motor 109 with the help of lead screw 123, moves the nozzle(s) up or down using linear motion guide-ways 124 coupled to the twin-phase air-assisted and forced-liquid based electrostatic nozzle(s) 106 via pad 125 as per the input signal from the drive. The upward or downward movement (z-axis movement) of nozzle(s) changes the spray envelop (cone angle), therefore, it requires spray envelop control servo-motor 111 to adjust the cone angle of coverage.

The input signal is given to spray envelop control servo-motor 111 to adjust the distance between the nozzles so that a uniform spray distribution can be achieved. The rack and pinion 126 of twin-phase air-assisted and forced-liquid based electrostatic nozzle(s) 106 is moved using spray envelope control servo-motor 111 to achieve the desired distance between the two nozzles for uniform and complete coverage. Depending upon the number of objects (quantity) to be coated, the movement along the x-y plane is controlled using the x-y axis servo-motor 110. The movement of the assembly of nozzle(s) takes place along the linear motion guideways 127 using lead screw 128. The assembly of nozzle(s) is coupled to linear motion guideways 127 through pad 129. The x-y plane adjustment is mainly for the reason of adjusting and incorporating more number of nozzle(s) so that the number of objects to be coated could be increased upon the roller-conveyor system. The input is provided to tilt-control servo-motor 112 through the drive present in control unit 122 for nozzle(s) orientation.

This height adjustment mechanism controls the movement along x, y, and z-axis on the basis of feedback received from the pressure sensing and control unit. The control unit has the input from the ultra-low pressure sensor and based on input, the height adjustment mechanism adjusts the height through drives present in control unit as per requirement of the object to be coated.

The twin-phase air-assisted and forced-liquid based electrostatic nozzle(s) 106 has been shown in FIG. 2 and each part is described in details for better understanding of embodiments of the present invention. The nozzle(s) has two inputs i.e. compressed air and liquid from air compressor and controlled liquid flow pump respectively. The controlled liquid flow pump has been used to compensate the offset in the desired liquid flow rate due to change in viscosity of liquid coating material.

The twin-phase air-assisted and forced-liquid based electrostatic nozzle(s) 106 has various sub-parts namely nozzle head 130, outer cap 131, inner cap 132, connecting coupler 133, charging electrode 134, connecting electrode 135, metallic air supply connector 136 and metallic liquid connector 137. The nozzle head 130 is made of insulating, chemically non-reactive and food grade material having liquid passage tip 138 of defined diameter in the center of the nozzle. The liquid passage tip 138 extends up to a region of inner cap 132 where the mixing of compressed air and liquid supplied by controlled liquid flow pump 105 takes place at atomization zone. The nozzle head 130, outer cap 131 and inner cap 132 are made of insulating material which can withstand high voltage up to a certain kilovolts. The nozzle head 130 has six number of equidistant air passage 139 coaxially around the liquid passage tip 138.

The charging electrode 134 connected to a connecting electrode 135 through high resistant connecting wire 140 and the connecting electrode 135 is connected to high voltage power supply connector 141 through a high resistant wire 142. The nozzle head 130 is connected to metallic air supply connector 136 and metallic liquid connector 137 through connecting coupler 133. The metallic air supply connector 136 and metallic liquid connector 137 of twin-phase air-assisted and forced-liquid based electrostatic nozzle(s) 106 is connected to manifold 113 through individual air supply pipes 115 and liquid supply pipes 116 respectively. Air supply pipes 115 and liquid supply pipes 116 connected to metallic air supply connectors 136 and metallic liquid connectors 137 respectively.

The droplets generated at atomization zone and charged by high electric field region exit from coaxial passage 143 formed by outer cap 131, O-ring 144 and charging electrode 134. The charged droplets come out from V-shaped exit 145 of outer cap 131. An arrangement of dissipating the stray current generated by attracting charged droplets to nozzle(s) body is made via a very high resistance 146 which is connected to ground to avoid any shock and hazards.

Considering the FIG. 3, an application specific high voltage generation unit 147 in electrical cabinet 148, which is a part of unit C, for charging of liquid sprays has been described. The high voltage is supplied to charging electrode 134 by high voltage generation unit 147 in the range of 1.0-1.7 kV. The high voltage generation unit consists of four sub-units namely, DC to AC conversion 149, AC to AC conversion 150, AC to DC conversion 151 and a device protection and current controlling mechanism 152.

The DC to AC conversion sub-unit 149 comprises a DC voltage source 153, a voltage regulator, PWM generator, a frequency selector and a power MOSFET which finally goes to primary windings of a Fly-Back transformer. In the present invention, the Fly-Back transformer section is termed as AC to AC conversion sub-unit 150.

The AC to DC conversion sub-unit consists of a voltage multiplier, rectifier, filter and regulator circuitry. In the AC to DC conversion sub-unit, the voltage from secondary windings is fed to a voltage multiplier and a rectifier which produces the desired high voltage for the charging of liquid sprays.

The voltage multiplier unit has device protection and current controlling mechanism 152 to avoid any kind of failure leaving to the damage of high voltage generation unit. The output voltage is taken from output voltage port 154 which is connected to high voltage power supply connector 141 of twin-phase air-assisted and forced-liquid based electrostatic nozzle(s) 106 through a high voltage wire 155 which is going via electrical junction box 156. The electrical junction box 156 has another input of voltage from control unit 122 which supplies the voltage signal to four servo-motors namely z axis servo-motor 109, x-y axis servo-motor 110, spray envelop control servo-motor 111 and nozzle tilt-control servo-motor 112 and pressure sensor 107.

The device protection and current controlling mechanism 152 includes a bridge rectifier, a voltage divider, an A/D converter and a duty cycle selector. The designed power supply is application specific and developed for the charging of liquid sprays for edible coatings to fruits and vegetables to enhance the shelf life, nutritional value and sensory attributes.

EXAMPLES

The following examples are given by way of illustration of the working of the present invention in actual practice and should not be construed to limit the scope of the present invention in anyway.

Example 1

In this method of charging, direct-transfer to the droplet-formation zone of a liquid jet results from electrostatic induction of electrons on to the continuous liquid jet and in order to maintain it at ground potential, the presence of closely positioned induction electrode of positive polarity is required. Droplets, formed from the surface of this negatively-charged jet, will depart with net negative charge provided the droplet-formation zone remains subject to the inducing electric field acting between the non-ionizing electrode and the liquid jet. In order to achieve wraparound effect in electrostatic edible coating to fruits and vegetables, a significant amount of charge has been given to fine droplets which are acted upon by electric field. The droplets are charged more than a 3.2 mC/kg charge-to-mass ratio at an applied voltage of 1.0 kV, flow rate of 150 ml/min and an applied air pressure of 3 bar.

Example 2

The system is designed and developed for edible liquid coatings such as Aloe Vera leaf gel, antimicrobials, commercially available wax coatings, antioxidants, polysaccharides and protein based coating materials with wide range of viscosity and conductivity. Edible materials has been coated efficiently and effectively by using a novel and innovative method of electrostatic spraying which comprises height adjustment for thrust correction through pressure sensing and feedback mechanism and twin phase air-assisted and forced-liquid flow based nozzle(s).

Advantages

The present invention provides the process, method and system for edible liquid coating to freshly harvested fruits and vegetables and minimally processed food commodities to enhance the shelf life, nutritional value and sensory attributes based on innovative method of electrostatic coating comprises height adjustment for thrust correction through pressure sensing and feedback mechanism and twin phase air-assisted and forced-liquid flow based nozzle(s). The various advantages of the present invention are:
   This invention will provide complete and uniform coverage to the objects including contact point through electrostatic spraying and uniquely designed nozzle(s) arrangement.
   The height adjustment and varying number of nozzles, imparts flexibility to increase or decrease the number of objects (quantity) to be coated.
   The invention provides drift free coating, hence leaves no spot uncoated. It imparts uniformity and efficiency to the coating.
   The system can be used for wide range of viscous and conductive liquid based solutions of edible coatings.
   Edible coatings can also serve as carrier for anti-browning, antioxidant and antimicrobial agents, colorants, flavours, nutrients.
   Another important advantage of edible coating is the reduction of synthetic packaging waste because these coatings are composed of biodegradable raw materials.
   The invention will provide method for efficient utilization of coating material and natural resources and reducing the chemical load in the environment.
   The invention will provide a solution towards food security, consumer health and safety.

We claim:

1. An electrostatic edible coating system having a variable height mechanism for thrust correction through pressure sensing comprising:
   a first unit consisting of a motion and orientation control and twin-phase air-assisted and forced-liquid flow based electrostatic nozzle(s);
   a second unit comprising a roller-conveyor, a material accumulator for drifted uncoated-coating material, a pressure sensor and an induction motor configured to drive the roller-conveyor, and
   a third unit consisting of a control unit for position and orientation, an electrical cabinet including application specific high voltage power supply unit with current controlling mechanism for charging of liquid sprays and input voltage signals to drive motors and controlling units, an air compressor, a coating material reservoir and a liquid flow control pump,
   wherein disinfected, washed and dried fruits and vegetables fed on a receiver unit of roller-conveyor system driven by the induction motor with controlled revolutions per minute (rpm) and power are coated with coating material from a material reservoir, pumped by the liquid flow control pump to twin-phase air-assisted and forced-liquid flow based electrostatic nozzle(s) via a manifold with controlled pressure and residence time for uniform coating of edible materials with different viscosity.

2. The system as claimed in claim 1 wherein the twin-phase air-assisted and forced-liquid based electrostatic nozzle(s) comprises a nozzle head consisting of six number of equidistant air passage coaxially around a liquid passage tip, an outer cap, an inner cap, a connecting coupler, a charging electrode, a connecting electrode, a metallic air supply connector and a metallic liquid connector with a liquid passage tip extending up to a region of an inner cap, where mixing of compressed air and liquid supplied by the liquid flow control pump takes place at an atomization zone.

3. The system as claimed in claim 1 wherein the nozzle(s) has two inputs comprising compressed air from the air compressor and a liquid material reservoir pumped by the liquid flow control pump to compensate for an offset in the desired liquid flow rate due to change in viscosity of liquid coating material via manifold and the nozzle(s) may vary in number as per the requirement of liquid flow rate and the edible materials to be coated.

4. The system as claimed in claim 1 wherein the height adjustment of the tip of the twin-phase air-assisted and forced-liquid flow based electrostatic nozzle(s) from the roller-conveyor is done using a motion control system comprising the pressure sensor, a feedback and an assembly of servo-motors which adjusts the position of the twin-phase air-assisted and forced-liquid based electrostatic nozzle(s) in x, y and z axes and orientation.

5. The system as claimed in claim 1 wherein an assembly of servo-motors consists of four servo-motors including an z axis servo-motor, an x-y axis servo-motor to adjust position of the electrostatic nozzles(s) to accommodate a number of objects to be coated, a spray envelop control servo-motor to adjust the distance between the electrostatic nozzles for uniform and a complete coverage and nozzle tilt-control servo-motor to adjust the orientation of the electrostatic nozzle(s) for an efficient coverage of objects.

6. The system as claimed in claim 1 wherein an uncoated-coating material collected in a V-shaped material accumulator attached below the roller-conveyor is carried back to the coating material reservoir through a liquid material recollecting pipe.

7. The system as claimed in claim 1 wherein the pressure sensor is removable or movable from the roller-conveyor after a one-time height measurement and setting of the nozzle(s) height from the edible material to be coated.

8. The system as claimed in claim 1 further comprising a high voltage generation unit for charging of liquid sprays in the range of 1.0-1.7 kV, wherein the high voltage generation unit comprises four sub-units including a DC to AC conversion, an AC to AC conversion, an AC to DC conversion and a device protection and current controlling mechanism, wherein:

the DC to AC conversion sub-unit comprises a DC voltage source, a voltage regulator, a PWM generator, a frequency selector and a power MOSFET which finally goes to primary windings of a Fly-Back transformer (AC to AC conversion subunit);

the AC to DC conversion sub-unit consists of a voltage multiplier, a rectifier, a filter and a regulator circuitry which produces a desired high voltage for the charging of liquid sprays; and the device protection and current controlling mechanism includes a bridge rectifier, a voltage divider, an A/D converter and a duty cycle selector to avoid any kind of failure leaving to the damage of high voltage generation unit.

9. The electrostatic edible coating system as claimed in claim 1, wherein an arrangement of dissipating stray current generated by attracting charged droplets to nozzle(s) body is made via a very high resistance which is connected to ground to avoid any shock and hazards.

10. The system as claimed in claim 2 wherein the nozzle head, the outer cap and the inner cap are made of insulating, chemically non-reactive and food grade material which withstands high voltage up to a certain kilovolts along with all the liquid pipes used in the coating system are made up of food grade material which is non-reactive and non-corrosive in nature at normal/standard temperature and pressure.

11. The system as claimed in claim 1, wherein the edible materials include Aloe Vera leaf gel, antimicrobials, antioxidants, polysaccharides and protein-based materials.

* * * * *